(No Model.) 6 Sheets—Sheet 1.

F. P. MURPHEY.
CORN PLANTER.

No. 381,883. Patented Apr. 24, 1888.

ATTEST
W. W. Graham
G. D. Chamberlain

INVENTOR
F. P. MURPHEY
By L. P. Graham
his attorney (No Model.) 6 Sheets—Sheet 2.
F. P. MURPHEY.
CORN PLANTER.

No. 381,883. Patented Apr. 24, 1888.

ATTEST.
W. W. Graham.
J. D. Chamberlain.

INVENTOR.
F. P. MURPHEY.
By L. P. Graham.
his attorney.

(No Model.) 6 Sheets—Sheet 3.

F. P. MURPHEY.
CORN PLANTER.

No. 381,883. Patented Apr. 24, 1888.

Fig. 3.

ATTEST.
W. W. Graham.
H. D. Chamberlain.

INVENTOR.
F. P. Murphey.
B. L. P. Graham.
his attorney.

(No Model.) 6 Sheets—Sheet 4.

F. P. MURPHEY.
CORN PLANTER.

No. 381,883. Patented Apr. 24, 1888.

ATTEST:
W. W. Graham.
H. D. Chamberlain.

INVENTOR:
F. P. MURPHEY,
By L. P. Graham,
his attorney.

(No Model.) 6 Sheets—Sheet 5.

F. P. MURPHEY.
CORN PLANTER.

No. 381,883. Patented Apr. 24, 1888.

ATTEST.
W. W. Graham.
O. D. Chamberlain.

INVENTOR.
F. P. MURPHEY.
By L. P. Graham.
his attorney.

(No Model.) 6 Sheets—Sheet 6.
F. P. MURPHEY.
CORN PLANTER.
No. 381,883. Patented Apr. 24, 1888.
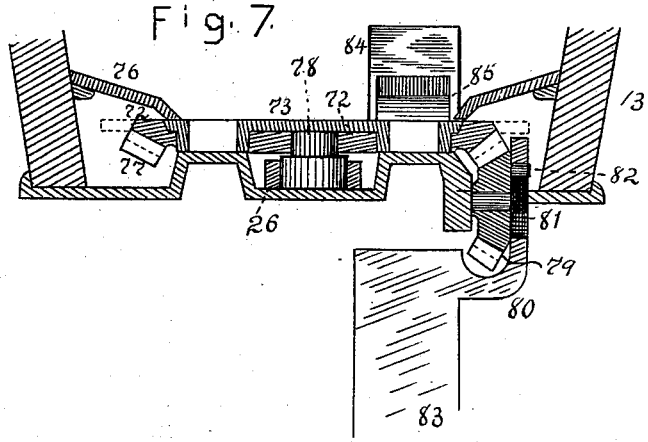
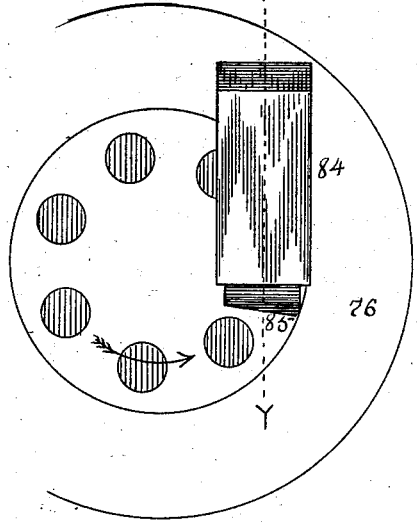
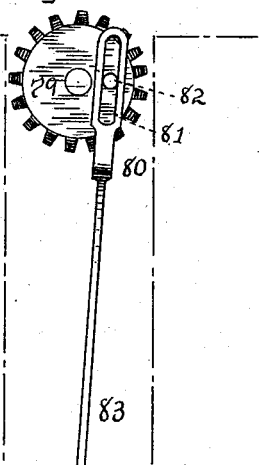
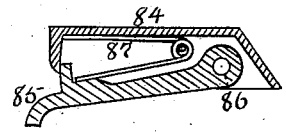
ATTEST.
W. W. Graham.
H. D. Chamberlain.
INVENTOR—
F. P. MURPHEY.
By L. P. Graham.
his attorney.

UNITED STATES PATENT OFFICE.

FRANK P. MURPHEY, OF DECATUR, ILLINOIS, ASSIGNOR OF ONE-HALF TO WILLIAM D. CHAMBERLAIN, OF SAME PLACE.

CORN-PLANTER.

SPECIFICATION forming part of Letters Patent No. 381,883, dated April 24, 1888.

Application filed September 19, 1887. Serial No. 250,035. (No model.)

*To all whom it may concern:*

Be it known that I, FRANK P. MURPHEY, of Decatur, in the county of Macon and State of Illinois, have invented a Corn-Planter, of which the following is a specification.

My invention refers to the construction of the planter, both generally and in detail, and consists in the combinations, sub-combinations, details of construction, and relative arrangement of parts hereinafter specified and claimed.

Figure 1:
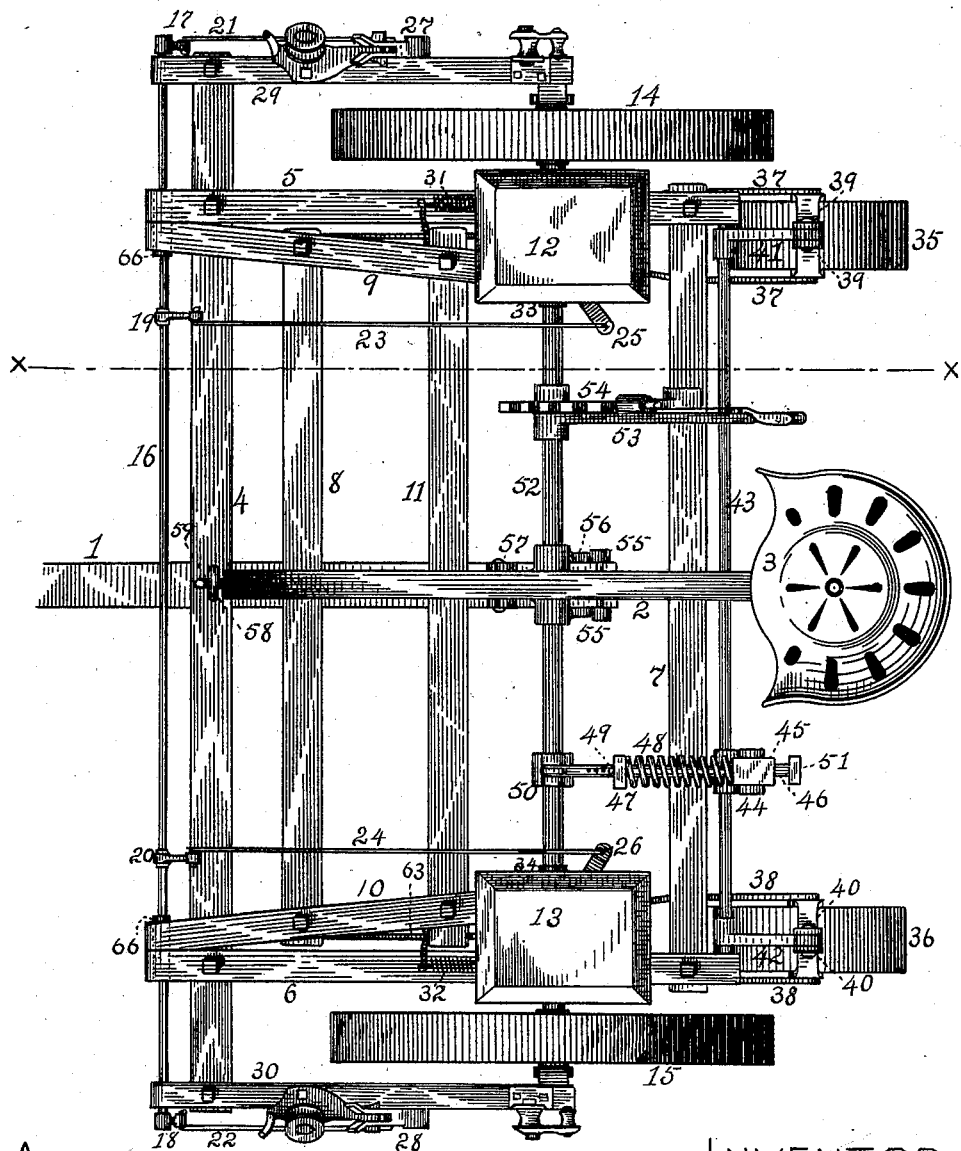
Figure 2:
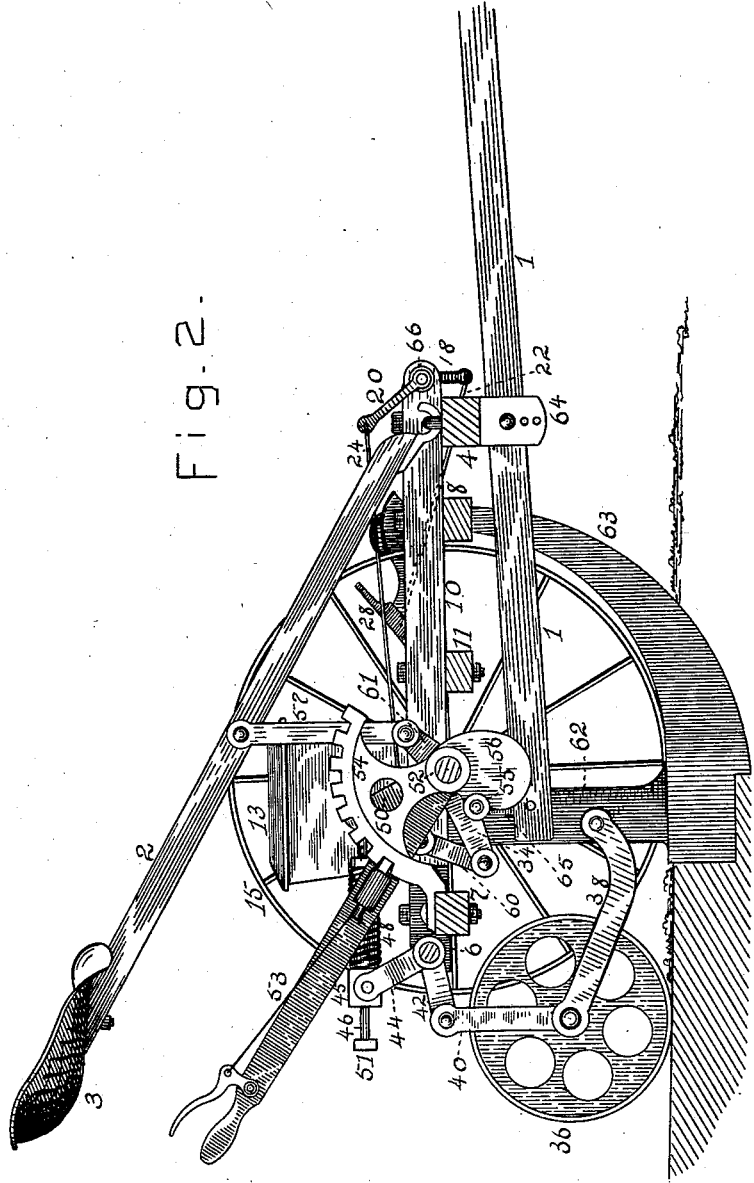
Figure 4:
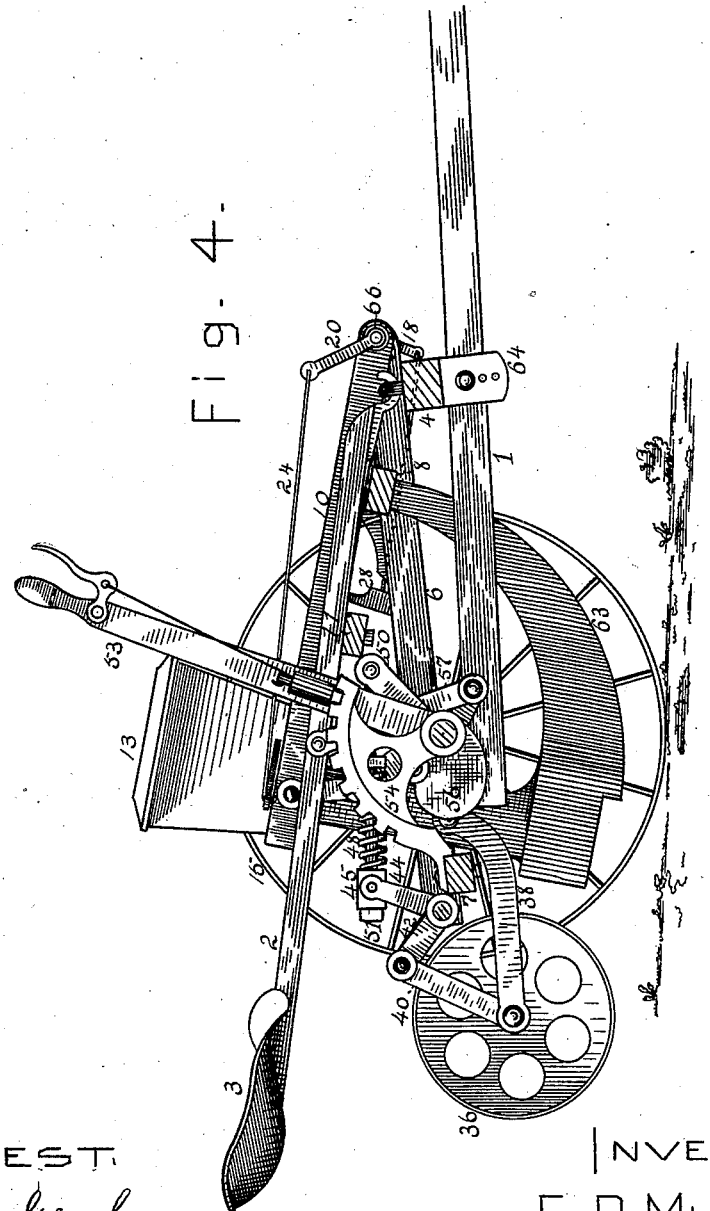
Figure 5:
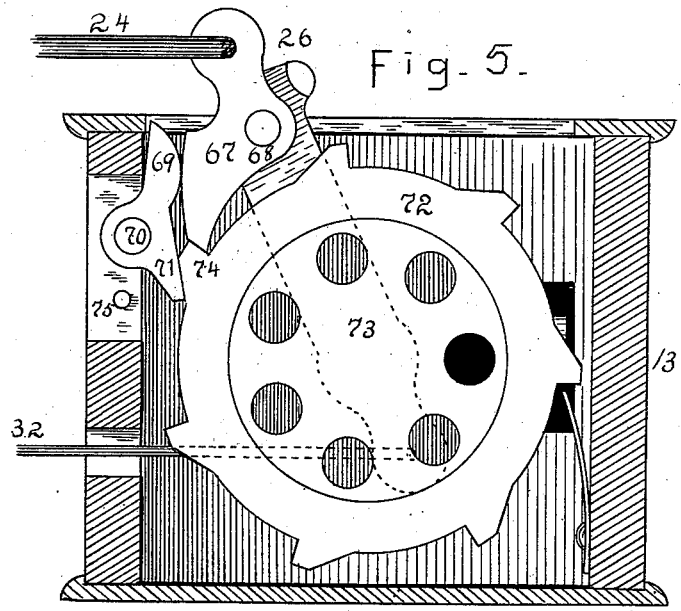
Figure 6:
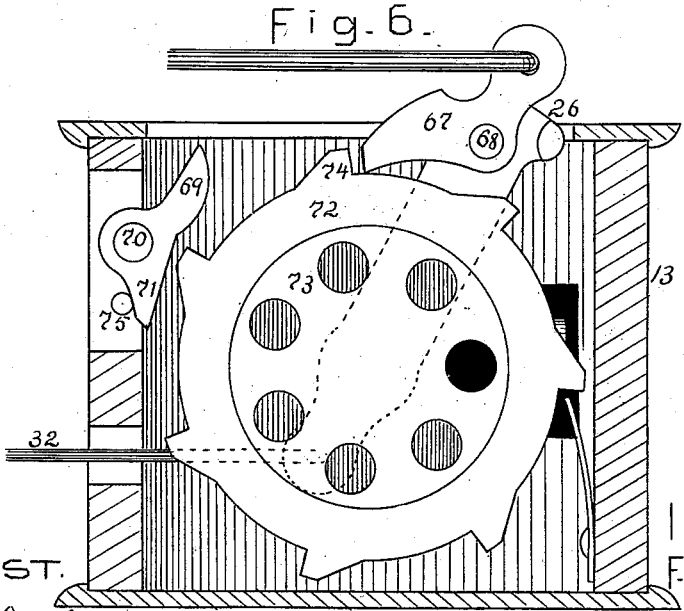

In the drawings accompanying and forming a part of this specification, Figure 1 is a plan of my device. Fig. 2 is an elevation of a side of the planter, cutting the transverse elements on the broken line x in Fig. 1, and representing the planting mechanism at its lowest depth. Fig. 3 is identical with Fig. 2, except that the planting mechanism is somewhat elevated in the former figure. Fig. 4 shows the planting mechanism at its highest position, and the conditions are otherwise the same as in Figs. 2 and 3. Figs. 5 and 6 represent sections of a seed-box on a horizontal line slightly above the bottom of the box, the one figure showing the seed-plate-actuating lever at the termination of its operative stroke and the other showing the lever quiescent, preparatory to making a stroke. Fig. 7 is a central vertical section of the mechanism shown in Figs. 5 and 6, with a converging plate and cut-off added. Fig. 8 is a rear view of the second drop-valve and its actuating-pinion. Fig. 9 is a plan of the cut-off in position on the seed-plate. Fig. 10 is a longitudinal vertical section of the cut-off on broken line Y in Fig. 9.

A frame composed of front bar, 4, rear bar, 7, and side bars, 5 and 6, is supported on axle 52. Supporting-wheels 14 15 are journaled on the ends of the axle. An inner frame, composed of side bars, 9 10, and transverse bars 8 11, pivots at its front ends on tubes 66, that pass through the front ends of bars 5 6. The axle has oscillatory motion in the outer frame, and is provided with hand lock-lever 53. Secured to rear bar, 7, and resting loosely on the axle, is segmental rack 54, that co-operates with the lock-lever to maintain the axle in its various positions of oscillatory adjustment.

Mounted on the inner frame, at the rear end thereof, are the seed-boxes 12 13. The seed-depositing shanks 62 extend downward from the boxes in the customary manner, and extending from the lower terminations of the shanks to transverse bar 8 are runners or furrow-openers 63. On the axle adjacent to the seed-boxes are crank-arms 34, extending rearwardly in an approximately horizontal position, and connecting the outer ends of said arms with bars 9 10 are links 60 and 61. The tongue 1 is pivotally connected with front bar, 4, through saddle 64, which is provided with a series of pivot holes that permit vertical adjustment, and the rear end of said tongue extends under the axle.

Extending downward from the axle on opposite sides of the tongue are flanges 56, and a pin extending through bosses 55 forms a point of connection for the link 65, that supports the rear end of the tongue. The covering-wheels 35 36 are connected with the shanks by straps 37 38. Traversing the rear end of the outer frame is rock-shaft 43, and projecting rearwardly from said shaft are approximately horizontal crank-arms 41 42, from which the covering-wheels are supported through links 39 40. Approximately vertical crank-arm 44 is rigidly secured to the rock-shaft, and in its bifurcated end is block 45, pivoted on trunnions. Rod 46 is connected with crank-arm 50, and has longitudinal motion in the block. Collar 47 has adjustment longitudinally on rod 46, and pin 49 may be placed in a hole in the rod to secure the collar in a certain position of adjustment. Spring 48 is placed on the rod between the collar and the block, and the head 51 on the end of the rod prevents said rod from being drawn through the block. Bars 29 30 connect with the ends of bar 4 and with the ends of the axle. Check-row tappets 27 28 have pivotal bearings on bars 29 30 at points a proper distance in advance of the seed-depositing shanks. Check-row shaft 16 traverses the front end of the planter through tubular pivots 66. Crank-arms 17 18 connect with the check-row tappets through rods 21 22, and crank-arms 19 20 connect with the planting mechanism through rods 23 24. An eye at 58 on bar 4 furnishes a point of pivotal connection for the hook 59 on the bar 2, that carries seat 3. Projecting forward from the axle is crank-arm 61, and connecting said crank-arm with the seat-bar 2 is brace-link 57. Levers 25 26 impart the motion of the check-row mechanism to the seed-plates, and springs 31 32 return said levers to position after a stroke has been made. The seed-plate 72 has peripheral ratchet-teeth 74, and is pivoted centrally on post 78. On the under surface of the seed-plate is the bevel crown-gear 77. The seed-cells in plate 72 are larger than necessary, and the auxiliary plate 73 has a series of bosses that have cells of suitable diameter and that precisely coincide with the cells of plate 72.

Pivoted on post 78, below the seed-plate, is arm 26. Pivoted at 68, on the outer end of arm 26, is pawl 67, in contact with the ratchet-teeth of the seed-plate. At a point at the termination of the operative throw of the arm 26 is stop-projection 69, pivoted at 70, and continued as a ratchet-lock, 71, on the opposite side of the pivot. A pin, 75, limits the throw of the stop-projection in one direction, as shown in Fig. 6, and the throw in the opposite direction is limited by the ratchet-wheel, as shown in Fig. 5. The arm 26 extends beyond its pivot, as shown by dotted lines in Figs. 5 and 6, forming in such extension a connecting-point for the returning spring.

Meshing with the crown gear of the seed-plate is vertical pinion 79, provided on its face with pin 82. The pinion performs a semi-rotation at each operation of the seed-plate, leaving the pin always approximately horizontal with the pivot of the pinion. The second drop-valve 83, which is of the common vibratory type, is provided with extension 80, that is slotted at 81 to receive the pin of the pinion.

76 represents the converging plate commonly used to incline the grain toward the seed-cells. The cut-off is composed of outer casing, 84, and inner plate, 85, pivoting at 86, concentric with the curvature of the end of the casing. The spring 87 holds plate 85 in contact with the seed-plate.

An oscillation of the axle affects the planting mechanism, the rear end of the tongue, the seat, and the covering-wheels. The inner frame, carrying the planting mechanism, swings on its pivot; but as the pivot rises and lowers through the motion of the tongue the shanks move in an approximately vertical line and permit accurate planting at various depths. The planting mechanism is supported from one side of the axle and the seat from the opposite side, so that the weight of the driver acts as a counterpoise for the planting mechanism and enables it to be easily adjusted through the hand-lever on the axle. The spring 48 exerts a yielding pressure on the covering-wheels, and the pressure is regulated to correspond to the depth of the runners, and to meet other requirements, by means of the adjustable collar on the rod. The rod projects beyond the block while the planter is in operation, and the play so provided permits the runners to be raised somewhat before the covering-wheels are affected. As a result of this construction, the covering-wheels are not unduly elevated when the runners are out of the ground, and no more power is exerted than is necessary to fit the planter to ride over obstructions ordinarily met in transferring the machine from field to field. The flanges 56 give stability to the tongue, while permitting the vertical adjustment necessary to counteract the relative disarrangement of check-row tappets and seed-depositing shanks that would accompany a simple pivoting motion of the inner frame. The check-row shaft is necessarily placed at the hinge of the frames, in order to permit the adjustment of the planting mechanism to be made without interfering with the operation of the check-row device. The detachable auxiliary seed-plate 73 provides for variation in the size of the seed cells, as plates identical in general construction and having their cells varying in diameter may be provided and readily interchanged. The pin of the pinion oscillates the second drop-valve and locks it in position at the termination of each stroke. The operation of the stop 69 71 is compound, the lever 26 being checked by its opposition, and the force so arrested being utilized to stop the motion of the seed-plate.

I am aware of the patent to Charles Hutchins, No. 143,826, dated October 21, 1873, in which is shown the combination of a rear frame mounted on wheels, and a forward frame carrying the seeding devices and furrow-openers, and hinging at its front end to the front end of the rear frame; but beyond adopting the method therein shown of hinging the frames together at their forward ends I have not availed myself of his experience.

Having thus described my invention, I claim as new and desire to secure by Letters Patent—

1. In corn planters, in combination, an outer frame carrying a transverse axle on which the supporting-wheels are mounted, and an inner frame over the axle carrying the planting mechanism in transverse alignment with the wheels and hinging at its front end to the front end of the outer frame, as and for the purpose set forth.

2. In corn-planters, in combination, an outer frame mounted on wheels, an inner frame carrying planting mechanism and hinging at its front end to the front end of the outer frame, and a check-row shaft traversing the frames at the hinge thereof.

3. In corn-planters, in combination, an outer frame mounted on wheels, an inner frame carrying planting mechanism, tubular pivots on which the frames hinge at their front ends, and a check-row shaft extended through the tubular pivots.

4. In corn-planters, in combination, an outer frame mounted on a transverse axle of supporting-wheels and carrying covering devices, and an inner frame over the axle carrying planting mechanism and hinging at its front end to the front end of the outer frame, as and for the purpose set forth.

5. In corn-planters, in combination, an outer frame having a rocking axle on which the supporting-wheels are journaled, an inner frame carrying planting mechanism and hinging at its front end to the front end of the outer frame, a lever for rocking the axle, and crank-arms on the axle from which the inner frame is supported at its rear end.

6. In corn-planters, in combination, an outer frame having a rocking axle on which the supporting-wheels are journaled, an inner frame carrying planting mechanism and hinging at its front end to the front end of the outer frame, a lever to rock the axle, crank-arms on a side of the axle from which the rear end of the inner frame is supported, and a crank-arm on the opposite side of the axle supporting the driver's seat.

7. In corn-planters, in combination, an outer frame having a rocking axle on which the supporting-wheels are journaled, an inner frame carrying planting mechanism and hinging at its front end to the front end of the outer frame, a lever to rock the axle, a tongue pivotally connected with the front of the outer frame and extended under the axle, crank-arms on the axle supporting the rear end of the inner frame, and a crank-arm on the axle from which the rear end of the tongue is suspended.

8. In corn-planters, in combination, an outer frame having a rocking axle on which the supporting-wheels are journaled, an inner frame carrying planting mechanism and hinging at its front end to the front end of the outer frame, covering devices pivotally connected with the shanks of the planting-runner, a bell-crank lever on the rear of the outer frame, from which the covering devices are suspended, a crank-arm on the axle connected with the bell-crank lever, and a hand-lever to rock the axle.

9. In corn-planters, in combination, an outer frame having a rocking axle on which the supporting-wheels are journaled, an inner frame carrying planting mechanism and hinging at its front end to the front end of the outer frame, a lever to rock the axle, crank-arms on the axle from which the inner frame is supported, a tongue pivotally connected with the front of the outer frame and extended under the axle, guide-flanges on the axle affording lateral support for the rear end of the tongue, and a crank-arm also on the axle, from which the rear end of the tongue is supported by a link.

10. In corn-planters, in combination, an axle for the supporting-wheels having oscillatory adjustment, crank-arms on a side of the axle supporting the planting mechanism, and a crank-arm on the opposite side of the axle supporting the driver's seat.

11. In corn-planters, in combination, an axle for the supporting-wheels having oscillatory adjustment, and crank-levers on the axle supporting the planting mechanism and the rear end of the tongue, respectively.

12. In corn-planters, in combination, an axle for the supporting-wheels having oscillatory adjustment, and crank-arms on the axle adapted to adjust the vertical positions of the planting mechanism and the covering devices.

13. In corn-planters, in combination, an axle for the supporting-wheels having oscillatory adjustment, and crank-arms on the axle connecting, respectively, with the planting mechanism, the driver's seat, and the rear end of the tongue.

14. In corn-planters, in combination, an axle for the supporting-wheels having oscillatory adjustment, and crank-arms on the axle connecting, respectively, with the planting mechanism, the driver's seat, the rear end of the tongue, and the covering devices.

15. In corn-planters, in combination, an outer frame having a transverse axle on which the supporting-wheels are journaled, an inner frame carrying planting mechanism and hinging at its front end to the front end of the outer frame, a seat-bar extended upward and backward from the front of the outer frame, and a brace supporting the seat-bar from the axle.

16. In corn-planters, in combination, an outer frame having a rocking axle on which the supporting-wheels are journaled, an inner frame carrying planting mechanism and hinging at its front end to the front end of the outer frame, a seat-bar pivotally connected with the front of the outer frame and extended upward and backward therefrom, and crank-arms on the axle supporting the planting mechanism and the seat-bar, respectively, as set forth.

17. In corn-planters, in combination, a frame mounted on wheels, a shaft traversing the frame, crank-arms on one side of the shaft supporting the planting mechanism, and a crank-arm on the opposite side of the shaft supporting the driver's seat.

18. The outer frame mounted on wheels and having its front bar extended laterally beyond the wheels, an inner frame carrying planting mechanism and hinging at its front end to the front end of the outer frame, check-row bars extended rearwardly from the outer ends of the forward bar of the outer frame, check-row tappets on the check-row bars, a check-row shaft in line with the hinge of the frames, and crank arms on the check-row shaft connected, respectively, with the check-row tappets and the planting mechanism of the inner frame.

19. The outer frame mounted on wheels and having its front bar extended laterally beyond the wheels, an inner frame carrying planting mechanism and hinging at its front end to the front end of the outer frame, check-row bars supported from the outer ends of the forward bar of the outer frame and from the terminations of the axle of the wheels, check-row tappets on the check-row bars, a check-row shaft in line with the hinge of the frames, and crank-arms on the check-row shaft connected, respectively, with the check-row tappets and the planting mechanism of the inner frame.

20. In corn-planters, in combination, the outer frame having the rocking axle on which the supporting-wheels are journaled, the inner frame carrying planting mechanism and hinging at its forward end to the forward end of the outer frame, the lever to rock the axle, the covering-wheels pivotally connected with the shanks of the planting-runners, the rock-shaft on the rear of the outer frame having approximately horizontal crank-arms from which the covering-wheels are supported, and having also an approximately vertical crank-arm, the block pivoted in the vertical crank-arm of the rock-shaft, the rod having longitudinal motion in the block, the crank-arm on the axle connecting with the rod, and the spring on the rod between the crank-arms.

21. In corn-planters, in combination, the outer frame having the rocking axle on which the supporting-wheels are journaled, the inner frame carrying planting mechanism and hinging at its forward end to the forward end of the outer frame, the lever to rock the axle, the covering-wheels pivotally connected with the shanks of the planting-runners, the rock-shaft on the rear of the outer frame having approximately horizontal crank-arms from which the covering-wheels are supported, and having also an approximately vertical crank-arm, the block pivoted in the vertical crank-arm, the rod having longitudinal motion in the block, the adjustable collar on the rod, the spring between the collar and the block, and the crank-arm on the axle connected with the rod.

22. In corn-planters, in combination, an outer frame having a rocking axle on which the supporting-wheels are journaled, an inner frame carrying planting mechanism and hinging at its front end to the front end of the outer frame, crank-arms on the axle from which the planting mechanism is supported, a lever to rock the shaft carrying a locking-catch, and a segmental rack on the axle and the rear bar of the outer frame adjacent to the locking-catch of the rocking lever.

23. In corn-planters, in combination, a seed-plate having peripheral ratchet-teeth, a lever pivoting concentric with the seed-plate and carrying a pawl in contact with the ratchet-teeth thereof, and a pivotal stop having one end in position to arrest the motion of the lever, and the other end in position to be swung against the back of a tooth of the seed-plate by the impingement of the lever, for the purpose set forth.

24. In corn-planters, in combination, a seed-plate having peripheral ratchet teeth, a lever pivoting concentric with the seed-plate and carrying a pawl in contact with the ratchet-teeth thereof, a lever-actuating rod connected with the outer end of the pawl, and a pivotal stop having one end in position to arrest the motion of the lever and the other end in position to be swung against the back of a tooth of the seed-plate by the impingement of the lever, for the purpose set forth.

25. In corn-planters, in combination, a seed-plate having peripheral ratchet-teeth and bevel crown-gear on its under surface, a lever pivoting concentric with the seed-plate and carrying a pawl in contact with the ratchet-teeth thereof, a pinion in mesh with the crown-gear adapted to make a semi-revolution at each seed-depositing movement of the seed-plate, a pin on the face of the pinion resting always on a line approximately horizontal with the pivot of the pinion, and a vibrating second drop-valve having its upper termination slotted to receive the pin of the pinion.

In testimony whereof I sign my name in the presence of two subscribing witnesses.

FRANK P. MURPHEY.

Attest:
L. P. GRAHAM,
W. D. CHAMBERLAIN.